United States Patent
Divelbiss et al.

(10) Patent No.: US 7,006,125 B2
(45) Date of Patent: Feb. 28, 2006

(54) STEREOSCOPIC IMAGE DEMULTIPLEXER FOR VGA COMPUTER ADAPTER SIGNALS

(75) Inventors: Adam W. Divelbiss, Wappingers Fall, NY (US); David C. Swift, Cortlandt Manor, NY (US)

(73) Assignee: Vrex, Inc., Elmsford, NY (US)

( * ) Notice: Subject to any disclaimer, the term of this patent is extended or adjusted under 35 U.S.C. 154(b) by 350 days.

(21) Appl. No.: 10/235,298

(22) Filed: Sep. 5, 2002

(65) Prior Publication Data

US 2003/0095306 A1 May 22, 2003

Related U.S. Application Data

(60) Provisional application No. 60/317,260, filed on Sep. 5, 2001.

(51) Int. Cl.
*H04N 13/04* (2006.01)
(52) U.S. Cl. .............................. 348/52; 348/42; 348/51
(58) Field of Classification Search ................ 345/419, 345/1.1; 348/42–60; 359/462, 464–465
See application file for complete search history.

(56) References Cited

U.S. PATENT DOCUMENTS

| | | | |
|---|---|---|---|
| 4,053,929 A | * | 10/1977 | Collins et al. ............... 348/170 |
| 4,523,226 A | * | 6/1985 | Lipton et al. ................. 348/49 |
| 4,764,812 A | * | 8/1988 | Hamley ....................... 348/512 |
| 5,260,773 A | * | 11/1993 | Dischert ....................... 348/42 |
| 5,767,898 A | * | 6/1998 | Urano et al. .................. 348/43 |
| 5,861,908 A | * | 1/1999 | Tonosaki et al. ............. 348/57 |
| 6,040,852 A | * | 3/2000 | Stuettler ....................... 348/43 |
| 6,573,928 B1 | * | 6/2003 | Jones et al. ................... 348/51 |

* cited by examiner

*Primary Examiner*—Matthew C. Bella
*Assistant Examiner*—Poi-Wei (Dennis) Chen

(57) ABSTRACT

The present invention utilizes a new and inexpensive method for stereoscopic demultiplexing from a single computer data source. The invention provides a means to switch the routing of left and right image data, if necessary. Additionally the invention provides for an internal swap of the green data signal between the two channels permitting the device to be used with polarized output projection systems in which the green light output is polarized orthogonally to the red and blue light output.

16 Claims, 6 Drawing Sheets

Stereoscopic Image Demultiplexer Functional Block Diagram

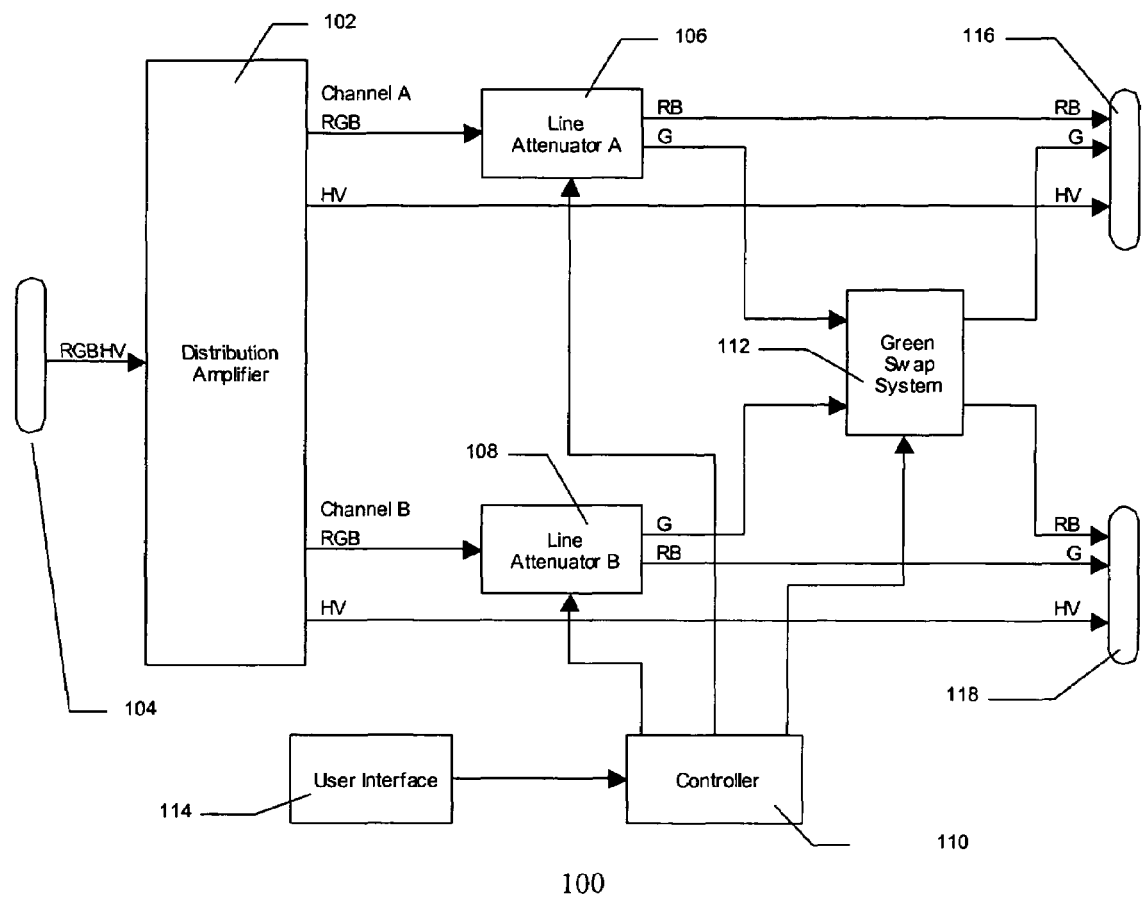
Figure 1 Stereoscopic Image Demultiplexer Functional Block Diagram

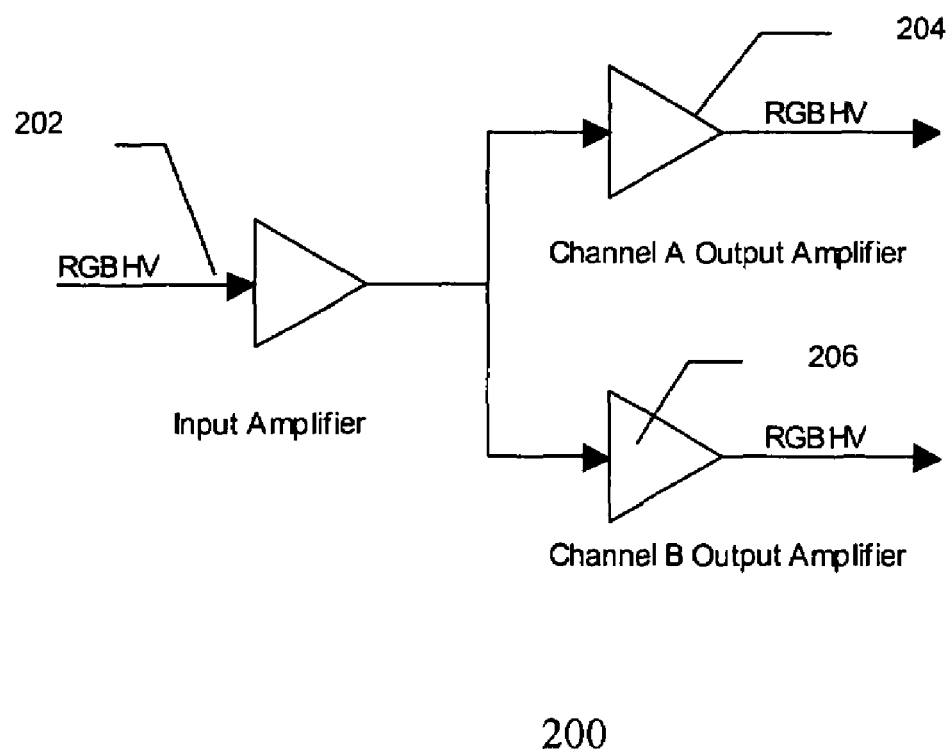
Figure 2 Distribution Amplifier Block Diagram

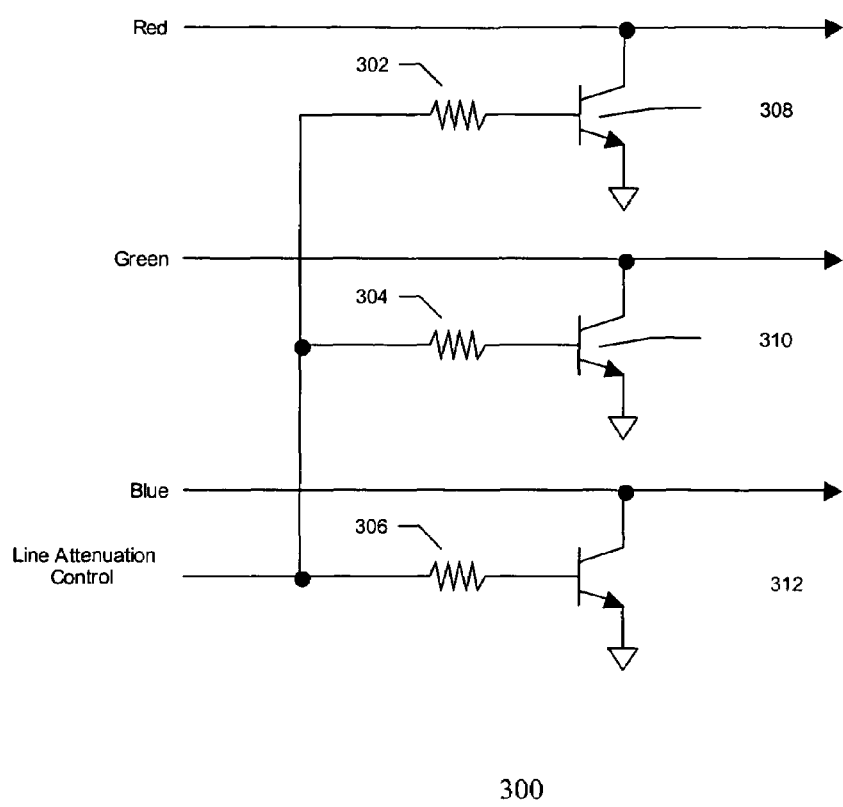
Figure 3 Schematic Diagram of the Line Attenuation Circuit in the Preferred Embodiment

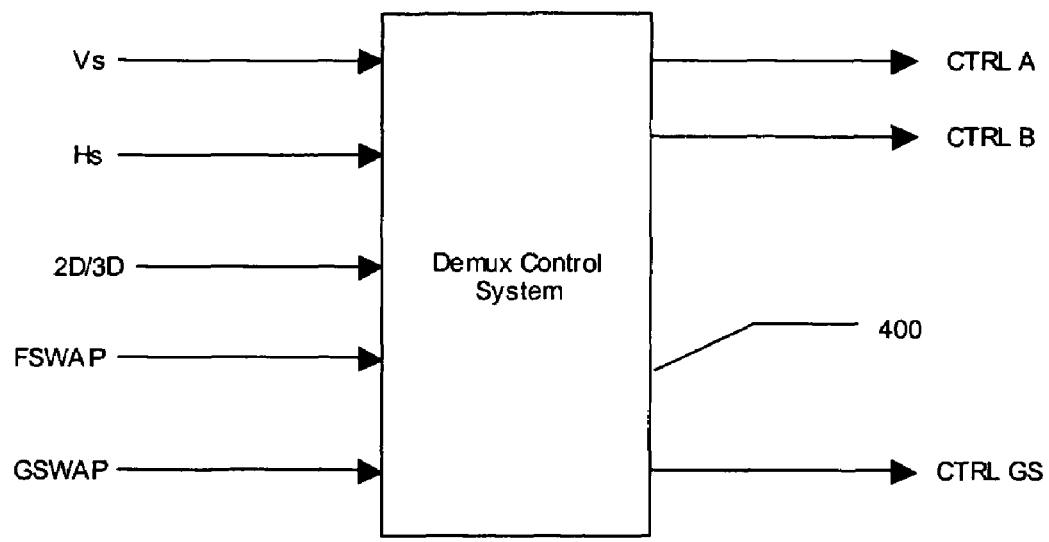
Figure 4 Demux Control System Block Diagram

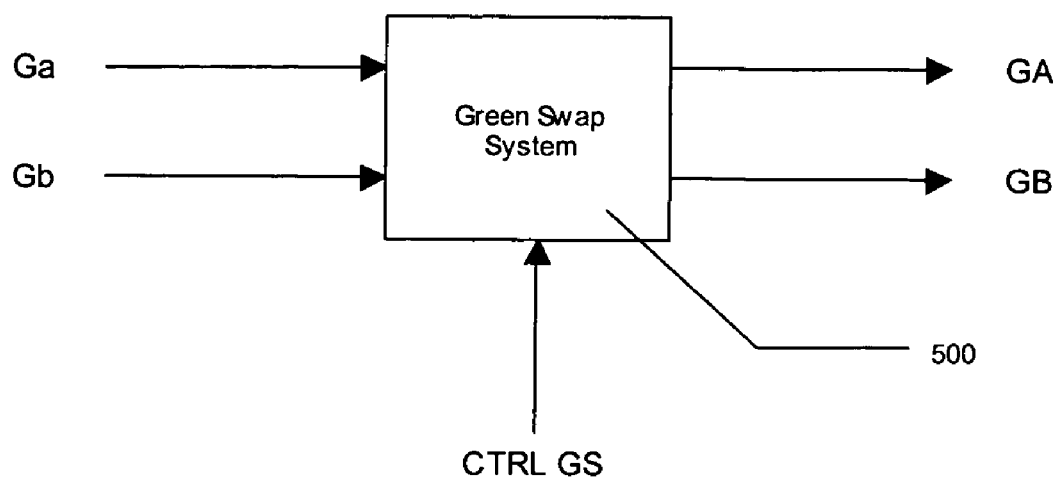
Figure 5 Green Swap System Block Diagram

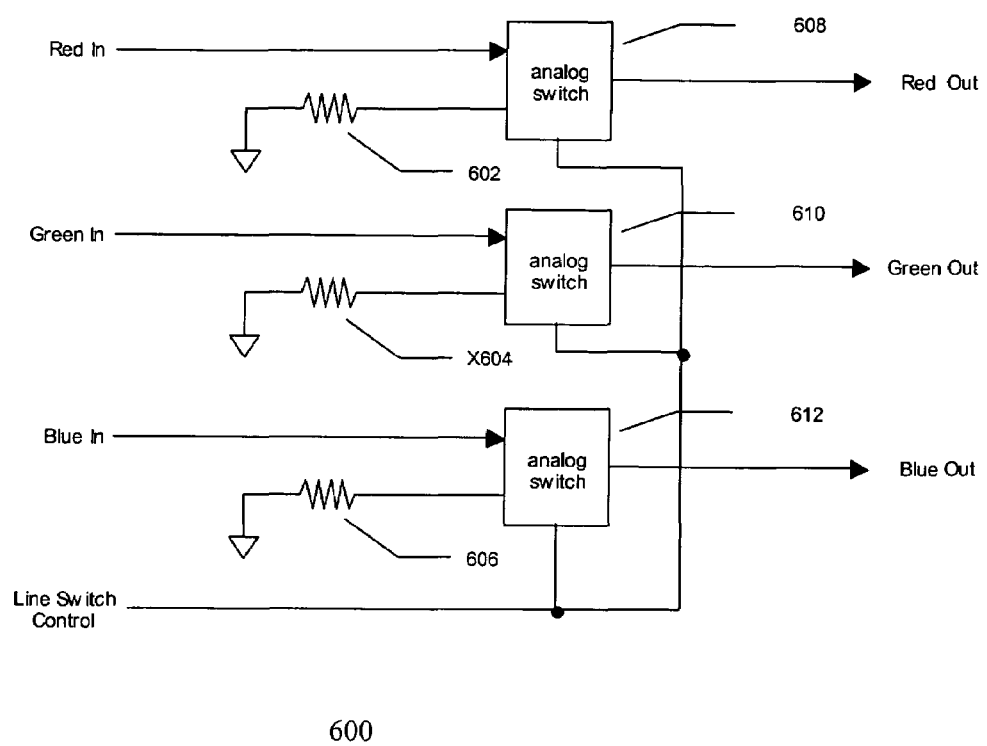
Figure 6 Schematic Diagram For an Alternative to the Line Attenuation Circuit

STEREOSCOPIC IMAGE DEMULTIPLEXER FOR VGA COMPUTER ADAPTER SIGNALS

CROSS REFERENCE TO RELATED APPLICATIONS

This application is related to provisional application No. 60/317,260 filed on Sep. 5, 2001 and is hereby incorporated by reference.

BACKGROUND OF THE INVENTION

1. Field of the Invention

The present invention is a stereoscopic multiplexer and in particular a stereoscopic multiplexer creating two separate signals from a single source for connecting a stereoscopic image to a dual projector system.

2. Description of the Related Art

Stereoscopic image presentation using dual projection systems has been popular in the past for the presentation of 3D video content. Efforts have also been made in the area of projecting stereoscopic data from a computer system using dual-projector 3D displays. In both cases, special stereoscopic image demultiplexing equipment has been required to split 3D content coming from a single source into two separate signals for the dual projector system. Historically stereoscopic image demultiplexers have been expensive and difficult to find. Other alternatives have involved the use of dual sources that must be synchronized. Examples of prior efforts include: a video 3D image demux that converts field sequential stereo to two separate VGA channels made by 3D ImageTek; and a device that converts computer page-flipped stereo into two VGA channels by Cyviz.

The present invention utilizes a new and potentially inexpensive method for stereoscopic demultiplexing from a single computer data source.

SUMMARY OF THE INVENTION

The present invention solves the problem of stereoscopic image demultiplexing from a single computer source by using a novel line-attenuation approach. Stereoscopic image demultiplexer products based on the present invention have the potential to be much more inexpensive than current technologies. There are trade-offs involved in image quality verses cost, however there is a gain in the applicability of the product to existing computer and projection systems.

A computer system transmits stereoscopic 3D content using the common "row-interleaved" 3D format at any resolution and any vertical refresh rate. The preferred embodiment splits the signal into two channels using a distribution amplifier technology. Since the left-right stereoscopic image information is encoded in the rows of the image, a special circuit is utilized to attenuate or "blank out" the odd rows in one image channel and the even rows in the other image channel. The resulting signals contain only left or right image information that is sent to the appropriate projection system. For example, in one embodiment, image channel A is assigned to pass only the left perspective image data and image channel B is assigned to pass only the right perspective image data. If the left perspective image data is encoded on odd lines and the right perspective image data is encoded on even lines, then the line attenuation circuit will attenuate even lines in image channel A and will attenuate odd lines in image channel B. Since the native computer data signals are analog and since the line attenuation circuit works equally well for either analog or digital signals, a product based on this simple concept can be made very inexpensively since it does not require a costly analog-to-digital conversion step.

The present invention also provides a means to switch the routing of the left and right image data if necessary. For example, if left image data is being routed to channel A and right image data is being routed to channel be, there are instances when the routing would need to be reversed such that right image data is routed to channel A and left image data is routed to channel B. This function is variously called "field-swap" or "pseudo-stereo swap".

An additional embodiment provides for an internal swap of the green data signal between the two channels. This functional permits the device to be used with polarized output projection systems (such as polysilicon based projection systems) in which the green light output is polarized orthogonally to the red and blue light output. This functionality opens up a much broader range of application for products based on the present invention.

DESCRIPTION OF THE DRAWINGS

These and other features, aspects, and advantages of the present invention will be become better understood with regard to the following description, appended claims, and accompanying drawings where:

FIG. 1 illustrates a stereoscopic image demultiplexer functional block diagram;

FIG. 2 illustrates a distribution amplifier block diagram;

FIG. 3 illustrates a schematic diagram of the line attenuation circuit in the preferred embodiment;

FIG. 4 illustrates a demux control system block diagram;

FIG. 5 illustrates a green swap system block diagram; and

FIG. 6 illustrates an alternative embodiment of the line attenuation circuit.

DESCRIPTION OF THE INVENTION

FIG. 1 illustrates a functional block diagram the Stereoscopic Demultiplexer 100 of the present invention. A single RGB computer data signal enters the system from the right. In order to properly direct left and right eye image information to the proper output channel, the input RGB signal must be formatted such that left eye information is present on even (or odd) lines only and right eye information is present on odd (or even respectively) line only. The Distribution Amplifier block 102 splits the single input channel data from the computer 104 into two separate RGB output channels. In the figure R represents the Red color analog data signal, G represents the green data signal, B represents the blue data signal, H represents the horizontal synchronization signal, and V represents the vertical synchronization signal. Both outputs of the distribution amplifier are electrically buffered and terminated separately. However the data in both channels remain mutually synchronized. The function of both Line Attenuator A 106 and Line Attenuator B 108 is to attenuate to black alternate lines of data in channel A and channel B respectively. When the unit is in 3D mode, Line Attenuator A 106 attenuates even (or odd) lines while Line Attenuator B 108 attenuates odd (or even) lines. When the unit is in 2D mode, no lines of data are attenuated in either channel. Attenuation is controlled by the Controller system 110. Because of the nature of some projection systems (e.g., certain polysilicon projectors), it is necessary to swap the green data signals between channels A and B in order to display 3D stereoscopic images. Therefore the Green Swap System 112 has been included to support those projection systems for which the Green light output has a polarization axis at a different angle than the red and blue light output. Under normal circumstances the Green data signal from Channel A passes straight through to the Channel A output. Likewise the Channel B Green data signal normally passes to the Channel B output 116. However, when the device is required to run in Green Swap Mode, the Controller commands the Green Swap System to route the Channel A Green data signal to the Channel B Green data output and the Channel B Green data signal to the Channel A Green data output. The Controller system receives input from the User Interface system 112, interprets the input according to a predefined truth table, and generates the appropriate control signals for Line Attenuator A 106, Line Attenuator B 108, and the Green Swap System 112.

FIG. 2 illustrates a functional block diagram of the distribution amplifier 200. The purpose of the Distribution Amplifier is to split the single RGB computer data input into two separate and electrically independent output channels with identical information. The Input amplifier 202 receives the RGBHV input and is properly terminated for the best quality signal. The output of the input amplifier is routed to two more identical Output Amplifiers 204 and 206. The Output Amplifiers boost each signal and provide proper 75-ohm termination on the outputs for best signal quality.

FIG. 3 illustrates a schematic diagram of the Line Attenuation System 300 of the preferred embodiment. A Line Attenuation Control signal controls the operation of three transistors 302, 304, and 306 whose purpose is to clamp the data line voltage close to zero when the control signal is "high". The result is a voltage value that represents "black" or "dark gray" on the display. The resistors at the base of each transistor eliminate image ghosting and tear that sometimes occurs when only one or two color channels are transmitting "black" (i.e., low voltage). This represents an improvement in the system presented in previous patent applications.

An a alternative to the line attenuation circuit described previously is the analog switch based mechanism shown in FIG. 6. The mechanism 600 shown is based on three analog switch components 608, 610 and 612 corresponding to the red, green, and blue color channels respectively. One input of each of the three analog switches is connected to one color channel input. The other input of each of the three analog switches is connected through a termination resistors to system ground 602, 604 and 606. The output of each analog switch is connected to an output color channel. This mechanism functions exactly as the line attenuation block described previously. The analog switch may be implemented using the PIV330Q video multiplexing chip from Pericom or other similar analog switch.

FIG. 4 illustrates the functional block diagram of the Demux Control System. In the preferred embodiment this system is implemented using a digital logic circuit that implements the function represented in Table 1. The purpose of the Demux Control System is to interpret user interface signals and the horizontal and vertical synchronization signals to generate the appropriate Line Attenuator and Green Swap system control signals.

Table 1 is a Demux Control System Line Attenuator Truth Table that illustrates the functionality implemented by the Demux Control System. When the 2D/3D input is 0, the device is to operate in 2D mode. Therefore all other inputs are ignored and the CTRLA and CTRLB outputs are set to 0 to disable line attenuation. When the 2D/3D signal is high, the device is in 3D mode. In this case the FSWAP, Vs, and Hs inputs are no longer ignored. The purpose of the FSWAP input is to switch the lines that are attenuated by each Line Attenuator. For instance, in the preferred embodiment, when the FSWAP input is 0, Line Attenuator A is commanded to attenuate even lines and while Line Attenuator B is commanded to attenuate odd lines. When FSWAP is 1 Line Attenuator A attenuates odd lines and Line Attenuator B attenuates even lines. When the Vs (vertical synchronization input) is 1 (that is the synch signal is active), CTRLA and CTRLB outputs are reset to an initial value that depends on the state of the FSWAP input. In the preferred embodiment, when Vs is 1 and FSWAP is 0, then CTRLA is set to 1 and CTRLB is set to 0. Alternately when Vs is 1 and FSWAP is 1, the CTRLA is set to 0 and CTRLB is set to 1. This functionality ensures that the appropriate lines are attenuated during each frame of image data. Finally, when Vs is 0 (the vertical synchronization signal is not present or active) the state of both CTRLA and CTRLB are toggled with each successive Hs signal pulse. This function identifies the lines that are to be attenuated for each channel.

TABLE 1

Demux Control System Line Attenuator Control Truth Table

| 2D/3D | FSWAP | Vs | Hs | CTRL A | CTRL B |
|---|---|---|---|---|---|
| 0 | X | X | X | 0 | 0 |
| 1 | 0 | 1 | X | 1 | 0 |
| 1 | 0 | 0 | ↑ | $\overline{CTRLA}$ | $\overline{CTRLB}$ |
| 1 | 1 | 1 | X | 0 | 1 |
| 1 | 1 | 0 | ↑ | $\overline{CTRLA}$ | $\overline{CTRLB}$ |

Table 2 illustrates the Truth Table for the green swap control output. When 2D/3D is 0 (the device is in 2D mode), the green swap function is disabled by setting the CTRL GS signal to zero. In 3D mode (2D/3D is 1), the CTRL GS output follows the state of the GSWAP input. However, when a change occurs on the GSWAP input, the CTRL GS output state is switched at the following Vs to prevent image artifacts associated with swapping the green data signals between channels.

TABLE 2

Demux Control System Green Swap Control Truth Table

| 2D/3D | GSWAP | CTRL GS |
|---|---|---|
| 0 | 0 | 0 |
| 1 | 0 | 0* |
| 1 | 1 | 1* |

*Transition occurs at Vs to prevent image artifacts

FIG. 4 illustrates the block diagram of the Green Swap System. As shown in Table 3 when the CTRL GS signal is 0 the green data signals are not swapped between channels. However when the CTRL GS signal is 1 green data signals are swapped. In the preferred embodiment the Green Swap System is implemented using an RGB switch integrated circuit that has proper termination and amplification built in to the design. Other methods for swapping the green data signal between stereoscopic image data channels are also possible. Table 3 illustrates the truth table for the Green Swap system as previously discussed.

TABLE 3

Demux Control System Green Swap Control Truth Table

| 2D/3D | GSWAP | CTRL GS |
|-------|-------|---------|
| 0 | 0 | 0 |
| 1 | 0 | 0* |
| 1 | 1 | 1* |

*Transition occurs at Vs to prevent image artifacts

The present invention has been shown and described in what are to be considered the most practical and preferred embodiments. It is anticipated that departures may be made there from and that persons skilled in the art will implement obvious modifications.

We claim:

1. A 3D stereoscopic image demultiplexer system comprising:
   3D stereoscopic input data having row-interleaved or line-alternate data;
   a splitting subsystem having a first splitting subsystem output and a second splitting subsystem output, each output containing 3D stereoscopic input data having row-interleaved or line-alternate data;
   a first line attenuation system coupled to the first splitting subsystem output that attenuates right image data and providing a first output having left image data;
   a second line attenuation system coupled to the second splitting sub system output that attenuates left image data and providing a second output having right image data; and
   a control system.

2. The Demultiplexer system of claim 1 wherein said left image output data includes left red image output data, left blue image output data, a left green image output data and left HV output data.

3. The Demultiplexer system of claim 1 wherein said right image output data includes right red image output data, right blue image output data, a right green image output data and right HV output data.

4. The Demultiplexer system of claim 1 further comprising a green swap subsystem.

5. The Demultiplexer system of claim 4 wherein said left image output data includes left red image output data, left blue image output data, right green data and left HV output data.

6. The Demultiplexer system of claim 4 wherein said right image data includes right red image output data, right blue image output data, left green output data and right HV output data.

7. The Demultiplexer system of claim 1 wherein a first of said line attenuation systems attenuates odd lines of said image data and second of said line attenuation systems attenuates even lines of image data.

8. The Demultiplexer system of claim 7 wherein said line attenuation systems attenuates red, green, or blue image data by clamping the image data voltage to artificially produce data representing "black" or "dark gray" image data.

9. The system of claim 8 wherein said line attenuation systems comprise discrete transistors each controlled by a common control system and whose base or gate are electrically separated to prevent image distortions during clamping.

10. The system of claim 8 wherein said line attenuation systems comprise analog switches each controlled by a common control system.

11. A method of 3D stereoscopic image demultiplexing comprising:
    inputting 3D stereoscopic input data having row-interleaved or line-alternate image data;
    splitting left and right image data by attenuating odd lines of said image data and alternatively attenuating even lines of image data to separate said 3D stereoscopic input data into a left image data channel and a right image data channel;
    controlling the timing of said splitting of said left and right image data;
    outputting said left image output data; and
    outputting said right image output data,
    wherein said left image output data includes left red image output data, left blue image output data, a left green image output data and left HV output data and said right image output data includes right red image output data, right blue image output data, a right green image output data and left HV output data.

12. The method of claim 11 further comprising swapping said green data wherein said left green input data is outputted on said right green output and said right green input image data is outputted on said left green output.

13. The method of claim 12 wherein said left image output data includes left red image output data, left blue image output data, right green data end left HV output data.

14. The method of claim 12 wherein said right image data includes right red image output data, right blue image output data, left green output data and right HV output data.

15. The method of claim 11 wherein said attenuating comprises attenuating red, green, or blue image data by clamping the image data voltage to artificially produce data representing "black" or "dark gray" image data.

16. A 3D stereoscopic image demultiplexer system comprising:
    means for inputting 3D stereoscopic input data having row-interleaved or line-alternate image data;
    means for splitting left and right image data including line attenuation means for attenuating odd lines of said image data and alternatively attenuating even lines of image data to separate said 3D stereoscopic input data into a left image data channel and a right image data channel;
    means of controlling the timing of said splitting of said left and right image data;
    means for outputting said left image output data; and
    means for outputting said right image output data,
    wherein said left image output data includes left red image output data, left blue image output data, a left green image output data and left HV output data and said right image output data includes right red image output data, right blue image output data, a right green image output data and left HV output data.

* * * * *